United States Patent
Currie

4,282,752

Aug. 11, 1981

[54] MULTI-CHANNEL TEMPERATURE MEASUREMENT AMPLIFICATION SYSTEM

[75] Inventor: James R. Currie, Huntsville, Ala.

[73] Assignee: The United States of America as represented by the Administrator of the National Aeronautics and Space Administration, Washington, D.C.

[21] Appl. No.: 98,569

[22] Filed: Nov. 29, 1979

[51] Int. Cl.³ ............................................... G01K 3/08
[52] U.S. Cl. .................................................... 73/341
[58] Field of Search .......................... 73/340, 341, 342

[56] References Cited

U.S. PATENT DOCUMENTS

| 3,678,486 | 7/1972 | Bickel et al. ...................... 73/341 X |
| 3,724,534 | 4/1973 | Weatherston ...................... 73/340 X |

Primary Examiner—Jerry W. Myracle
Attorney, Agent, or Firm—L. D. Wofford, Jr.; John R. Manning

[57] ABSTRACT

A multi-channel temperature measurement amplification system wherein a plurality of differential outputs of thermocouples are sequentially amplified by a common amplifier, the amplified outputs compared with a reference temperature signal in an offset correction amplifier, and a particularly poled output signal provided when a differential output is of a discrete level compared with a reference temperature signal.

6 Claims, 5 Drawing Figures

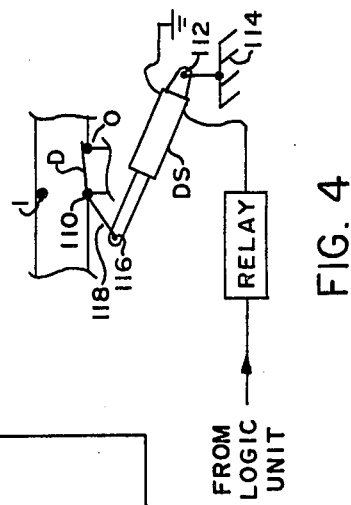
FIG. 4
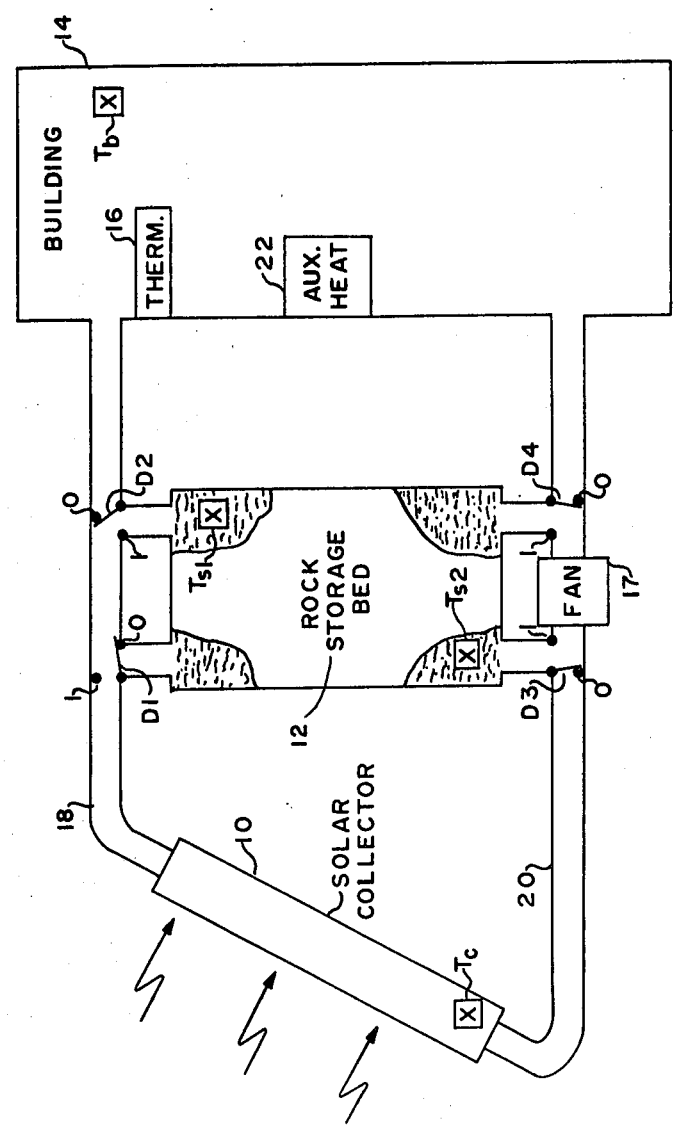
FIG. 1
FIG. 5

MULTI-CHANNEL TEMPERATURE MEASUREMENT AMPLIFICATION SYSTEM

DESCRIPTION

ORIGIN OF THE INVENTION

The invention described herein was made by an employee of the United States Government and may be manufactured and used by or for the Government of the United States for governmental purposes without the payments of any royalties thereon or therefor.

TECHNICAL FIELD

This invention relates to direct current amplifiers and amplifying systems, and particularly to an amplifying system capable of identically and consistently amplifying a plurality of temperature measurement signals and providing a particular polarity output when a signal receives a discrete level.

BACKGROUND ART

This invention is particularly directed to temperature measurements made in the operation of solar energy systems wherein, as an example, temperature measurements are made of a solar collector, a rock storage unit, and a building temperature. Most such systems employ copper-constantan thermocouples, one being used to measure a discrete one of the system perameters. The low level output of a thermocouple must be amplified, and, in prior systems, the output of individual thermocouples was individually amplified, and this has required that the amplifier have a low input offset drift and that a fixed offset be removed with either a potentiometer or a resistor before the system is placed in operation. Each amplified temperature measurement is then referenced to a thermal standard which is either an oven or a diode voltage generator. Solar equations must then be solved using two or more temperature measurements summed in a separate amplifier.

An alternate system uses thermistors, each being connected in a bridge to drive a discrete amplifier and the solar equations solved by using two or more outputs from the separate amplifiers, which are then summed in another amplifier. Such a system requires an extremely accurate reference voltage plus an extremely accurate thermistor to make each measurement.

The two systems discussed have several disadvantages. First, both systems deal with absolute temperatures when actually the difference temperatures are ultimately needed. Further, a different temperature is accurately obtained only when the absolute temperature of each measurement is accurately made. This is not easily accomplished since accuracy is degraded by amplifier offsets and gain error as well as sensor errors. To get around these problems, high quality components must be used. The system using copper-constantan thermocouples requires very stable amplifiers, a very accurate bias supply, the removal of offset, and the use of precision gain resistors. Both systems require laboratory calibration and precision components that often lead to long-term stability problems. It is believed that such systems will require regular maintenance to set offsets and gain adjustments.

STATEMENT OF INVENTION

In accordance with this invention, direct measurement is made of the differences between the discrete temperatures involved, as needed, and the resulting differential output signals are the only signals amplified. Second, amplification is effected by multiplexed operation of a single amplifier channel by which a sampled offset and gain correction signal is held and applied during the amplification of the temperature differential signals.

BRIEF DESCRIPTION OF THE DRAWINGS

FIG. 1 is an electrical schematic diagram of an embodiment of the invention.

FIG. 4 is a schematic illustration of the structure of one of the damper operated assemblies employed in the system shown in FIG. 2.

FIG. 5 is a logic truth table descriptive of the logic unit shown in FIG. 3.

DETAILED DESCRIPTION OF THE INVENTION

Figure 2:
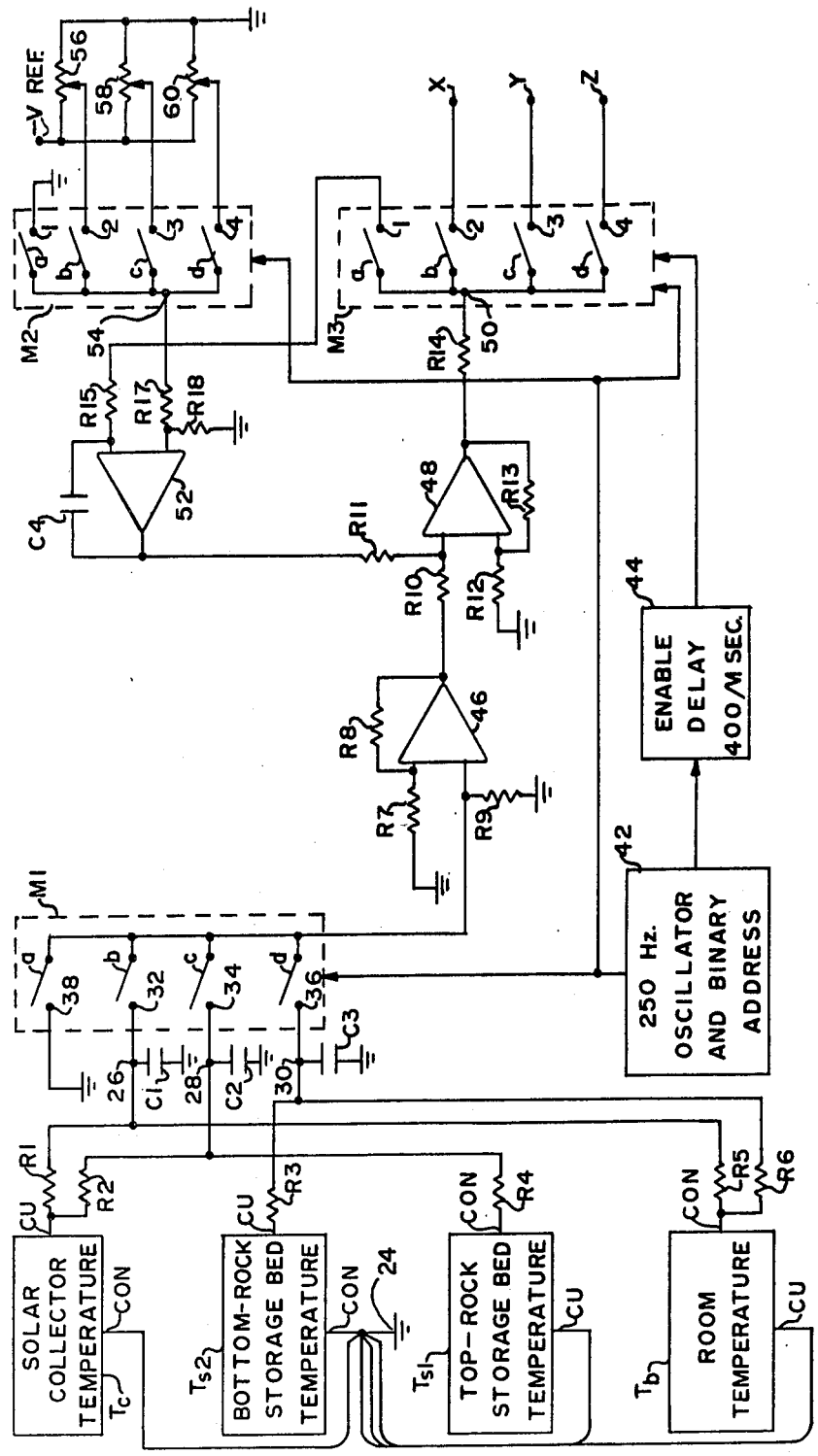
FIG. 2 is a schematic illustration of a solar heating system illustrating an example of the placement of the thermocouples schematically shown in FIG. 1.

Reference is first made to FIG. 2 which is illustrative of a solar heating system with which the present invention may be used and illustrating the placement of thermocouples electrically connected in the circuit shown in FIG. 1. In the system of FIG. 2, air flow is controlled between and through solar collector 10, a heat storage unit, such as rock storage unit 12, and a building 14 to be heated. Solar heat is received by solar collector 10 and is supplied, alternately, to rock storage unit 12 or to building 14, depending upon whether or not thermostat 16 and building 14 indicate a demand for heat for the building. Specifically, in accordance with the overall system described herein, four possible modes of operation are contemplated. In accordance with the first mode, if the temperature of building 14, as indicated by sensor $T_b$ is below the temperature in solar collector 10, as indicated by sensor $T_c$, by a selected value chosen to be sufficiently higher to effect an efficient transfer of heat between collector 10 and building 14, the present system causes fan 17 to be turned on and dampers D1, D2, D3, and D4 to be positioned to allow flow in the loop formed by pipes 18 and 20 between collector 10 and building 14 and to prevent flow through rock storage unit 12. On the otherhand, if the differential temperature between collector 10 and building 14 is insufficient in this regard, such a control arrangement will not be commanded.

In accordance with a second mode of operation, it will be assumed that the heat requirements in building 14 are satisfied and that thermostat 16 no longer requires heat, but the collector temperature exceeds the temperature of rock storage unit 12 by a selected value as measured by thermocouples $T_b$ and $T_s1$. During these conditions, the dampers shown would be closed off to the building, and hot air from collector 10 would be circulated through rock storage unit 12.

In accordance with the third mode of operation, if the temperature of collector 10 does not exceed that of building 14 by a selected amount, as indicated by thermocouples $T_c$ and $T_b$, and yet the temperature or rock storage unit 12 is indicated by thermocouple $T_s2$ exceeds the value of temperature in building 14, as indicated by thermocouple $T_b$, and thermostat 16 indicates a demand for heat, the dampers are set to enable fan 17 to force air through rock storage unit 12 to building 14. In modes 1, 2, and 3, auxiliary heater 22 is turned off.

As a fourth mode of operation, it is assumed that both the temperatures of collector 10 and rock storage 12 do not exceed the temperature of building 14 by a selected value, and yet thermostat 16 indicates a demand for heat, fan 17 is held off; and dampers D2 and D4 close off circulation to building 14, and auxiliary room heater 22 is turned off.

Referring now to FIG. 2, thermocouples $T_c$, $T_s1$, $T_s2$, and $T_b$ have one lead connected to a common ground point 24. The interconnection of leads, copper or constantan, of the thermocouples are poled to enable the desired subtraction of thermocouple outputs as required to determine the temperature differences necessary for control of the system as described. The output voltage of a thermocouple is positive at its copper terminal with respect to its constantan terminal. Thus, as shown, for example, the difference between solar collector temperature and room temperature is measured by summing the copper lead output of thermocouple $T_c$ with the constantan lead output of thermocouple $T_b$ through resistors R1 and R5 to a summing junction 26.

The difference between collector temperature and the temperature at the top region of rock storage unit 12 is determined by summing the copper lead of thermocouple $T_c$ with the constantan lead of thermocouple $T_s2$ through resistors R2 and R4 at summing junction 28.

The difference between the temperature at the bottom of rock storage unit 12 and room temperature is sensed by summing the copper lead of thermocouple $T_s2$ with the constantan lead of thermocouple $T_b$ through resistors R3 and R6 to summing junction 30.

From the foregoing, it follows that there would be provided at summing junction 26 a positive output when the temperature sensed by thermocouple $T_c$ exceeds that of thermocouple $T_b$; when the temperature of thermocouple $T_c$ exceeds the temperature of thermocouple $T_s1$, there will be a positive output at summing junction 28; and when the temperature indicated by thermocouple $T_b$ exceeds that of thermocouple $T_s2$, there will be a positive voltage at summing junction 30. The outputs appearing at the summing junctions are filtered by low pass filtering effected by capacitors C1, C2, and C3, respectively, and applied to input terminals 32, 34, and 36, respectively, of multiplexer M1. A fourth input terminal, terminal 38, of multiplexer M1 is connected to ground. The input terminals are connected to electronic switches a, b, c, and d, respectively, as shown. A common output lead 40 connects through the switches to the input terminals, and thus the signals on the input terminals are fed to lead 40 as switches a, b, c, and d and are sequentially and momentarily closed.

Multiplexer M1 is controlled by a 250 Hz oscillator and conventional binary address encoder 42 for effecting the sequential operation of switches of multiplexer M1 in a conventional manner and to commonly effect the same sequence of switching in like multiplexers M2 and M3. There is one difference with respect to multiplexer M3, and that is that an enable-delay circuit 44 provides a 400 microsecond delay (about 20% of an "on" period) in the operation of each switch of multiplexer M3, delay circuit 44 being connected between the output of oscillator 42 and multiplexer M3.

The signal on terminal 40, the output of multiplexer M1, is applied to the positive input of operational amplifier 46 across input resistor R9. Amplifier 46 is controlled in gain by negative feedback resistor R8 and input resistor R7, connected to the minus input of amplifier 46, gain typically set at 400. The output of amplifier 46 is fed through resistor R10 to the positive input of operational amplifier 48, and the gain of this amplifier is typically set at 400 by negative feedback resistor R13 and input resistor R12 connected to the negative input of amplifier 48. The output of amplifier 48 is fed through resistor R14 to a common input terminal 50 of the four switches a, b, c, and d of multiplexer M3. The output or switched terminal 1 of switch A of multiplexer M3 is fed through resistor R15 to the negative input terminal of signal correction amplifier 52.

Signal correction amplifier 52 is an operational amplifier having its output connected through resistor R11 to the positive input of amplifier 48, and having a signal holding capacitor C4 connected between the negative input and output of amplifier 52. Correction amplifier 52 has two functions. One, it detects the signal condition of the output of amplifier 48 during the interval when the signal input to amplifier 46, through multiplexer M1, is a zero signal, as when switch a of multiplexer M1 is closed. While there should appear a zero level at the output of amplifier 48, typically there will be some error or offset signal present at the minus input of amplifier 52, introduced by amplifiers 46 and 48. Amplifier 52 amplifies this error signal and reverses its phase and applies it as a corrective signal through summing resistor R11 to the plus input of operational amplifier 48. This corrective signal is held by capacitor C4 for a finite time, and thus a correction is maintained after multiplexer M1 is shifted from the closure of each switch a and for at least a period sufficient to cycle through all of the multiplexer channels. The thus sustained corrective signal effects a nulling or error subtraction at the input of operational amplifier 48 where this signal is summed out of phase with the signal from amplifier 46.

A second function of operational amplifier 52 is to sequentially provide discrete reference temperature difference signals (as modified by a correction signal) to the plus input of operational amplifier 48 which are, in essence, selectively subtracted from the output sequentially being fed through amplifier 46 to amplifier 48 from summing junctions 26, 28, and 30. These reference signals enable in a discrete case a positive output signal at the output of amplifier 48 and on a particular output terminal (2, 3, or 4 of multiplexer M3) when a measured temperature difference exceeds a selected reference temperature difference. Since selected reference temperature differences may differ in each of the three measurements made by this circuit, separate signals are generated. Thus, as shown, reference signals are fed to the plus input of amplifier 52 through common output terminal 54 of multiplexer M2, which terminal is fed, sequentially, through switches A-D of this multiplexer, in turn switching in unison with like identified switches of multiplexers M1 and M2. Input 1 of the switches of multiplexer M2 is connected to ground to thus provide a zero reference, through resistor 17, and across resistor 18 to amplifier 52 when the error voltage for amplifiers 46, 48, and 52 is being sampled. Inputs 2, 3, and 4 to the other three switches of multiplexer M2 are each, respectively, connected to a discrete potentiometer of potentiometers 56, 58, and 60, whereby voltage inputs to these switches of the multiplexer may be separately adjusted to establish separate temperature difference references as described.

Figure 3:
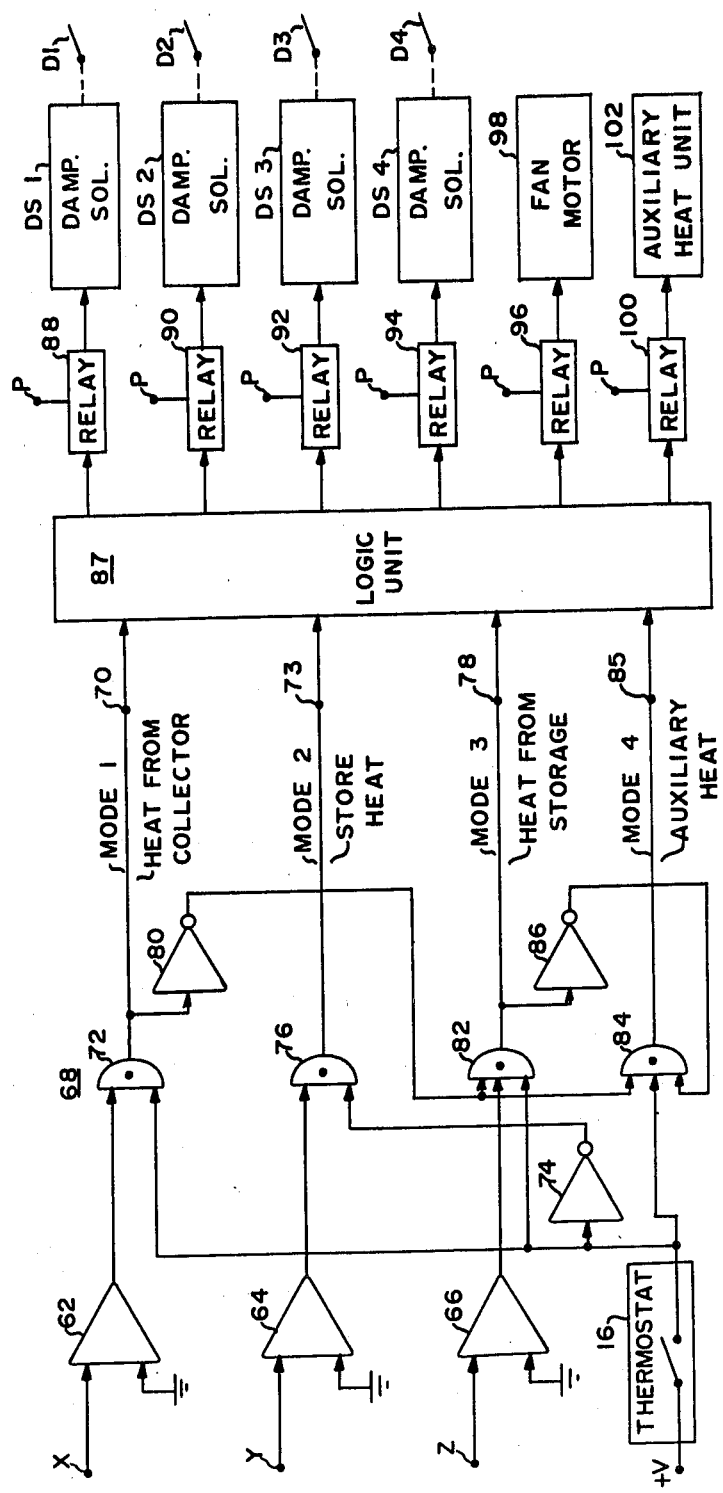
FIG. 3 is an electrical schematic diagram of the employment of the signal outputs of the amplification system shown in FIG. 1 to the solar heating system shown in FIG. 2.

In accordance with the foregoing arrangement of circuitry, outputs at terminals 2, 3, and 4 of multiplexer M3 sequentially appear at output terminals X, Y, and Z of FIG. 1 and at like input terminals to the logic circuitry of FIG. 3. As shown in FIG. 3, the three signals on these terminals are amplified to a logic level by amplifiers 62, 64, and 66, respectively. Thus, when the measured collector temperature-building temperature difference signal is positive and is greater than the reference temperature signal on potentiometer signal 56, there is provided a significant or binary 1 output at the output of amplifier 62. Similarly, when the measured collector temperature-rock storage temperature difference signal is positive and exceeds the reference signal of potentiometer 58, there is provided a binary 1 output at the output of amplifier 64. When the measured rock storage-room temperature differential signal is positive and exceeds the temperature reference from potentiometer 60, a binary 1 appears at the output of amplifier 66. The logic outputs of amplifiers 62, 64, and 66 are fed to logic circuitry 68.

In examining logic circuitry 68 in conjunction with the truth table of FIG. 5 for logic unit 86, it will be readily noted that mode 1 is selected, terminal 70 becomes true when thermostat 16 provides a command or binary 1 output to AND gate 72 and the output from amplifier 62 to AND gate 72 is true. This indicates that the room temperature of building 14 is below collector temperature by at least a selected amount as determined by the output of potentiometer 56. This signals that heat should be furnished by solar collector 10 to building 14.

If mode 2 is selected, terminal 73 goes true when thermostat 16 indicates no demand for heat and provides a zero output, which output is inverted by inverter 74 and is applied to AND gate 76, and the output of amplifier 64 applied to AND gate 76 is true. This thus indicates there is no requirement for room heat, but the temperature of the collector is greater than the temperature of the upper region of storage unit 12 by at least a selected amount.

If mode 3 is selected, terminal 78 goes true only when mode 1 is not true. The selection of mode 3 is accomplished by feeding the mode 1 signal through inverter 80 to AND gate 82; feeding the rock storage-minus-room temperature signal minus-reference signal from logic amplifier 66 to AND gate 82; and feeding an output from thermostat 16 to an input of AND gate 82. When all the inputs to AND gate 82 are true, this indicates that heat is being demanded, that heat is not available from solar collector 10, but is available from storage unit 12.

Mode 4 is selected by feeding the mode 1 signal through inverter 80 to AND gate 84; by feeding the mode 3 signal through inverter 86 to AND gate 84; and by supplying the utput of thermostat 16 to an input of AND gate 84. In this fashion, there is a mode 4 output, terminal 85, when there is a demand for heat, and yet such is not available from either solar collector 10 or rock storage 12. The mode 1-4 output signals are applied to logic unit 87 which is conventionally configured in accordance with the truth table of FIG. 5. It provides control output through relays 88, 90, 92, and 94 to damper solenoids DS1, DS2, DS2, and DS4 associated with correspondingly designated dampers D1-D4 to cause them to assume a "0" or "1" position as illustrated in FIG. 1 corresponding to a O (no signal) output or significant (logical 1) signal output. The solenoids are powered through power terminals P as switched by the relays. Logic unit 87 would include appropriate amplification means for the amplification of each output to operate the damper relays. Similarly, logic unit 87 would provide amplified output signals, depending upon the logical "0" or "1" siguation, to operate, through fan relay 96, fan motor 98, or, through heat relay 100, auxiliary heat unit 102. Fan motor 98 and auxiliary heat unit 102 are powered through the relays by an appropriate power source applied as shown through terminal P.

In operation, assuming a mode 1 situation, it will be noted that damper D1 would be in its "0" position, and dampers D2, D3, and D4 would be in their "1" position, enabling air flow directly between solar collector 10 and building 14. This mode also calls for fan 17 to be on, which then forces circulation of air between solar collector 10 and room 14. Auxiliary heat unit 22 is, at this time, turned off.

In a mode 2 situation, it will be noted that dampers D1, D2, and D4 are in their "0" position and damper D3 in its "1" position. With fan 17 on, as indicated, heat will be drawn from collector 10 through rock storage unit 12.

In a mode 3 situation, dampers D1, D2, and D4 are in a "1" position and damper D3 in a "0" position. Fan 17 is indicated as on, and thus heated air from rock storage unit 12 is supplied to building 14.

In a mode 4 situation, all the dampers are in their "0" position and fan 17 is turned off. Accordingly, no air is drawn from rock storage unit 12 or from solar collector 10. However, as indicated, auxiliary heat unit 22 is switched to an "on" state, and thus it alone provides heat for building 14.

Referring to FIG. 4, there is illustrated schematically how a damper D pivoted at point 110 is moved to either a "1" position as shown or a "0" position by the action of a damper solenoid DS, which in turn is pivotally connected at a point 112 to a fixed member 114 and pivotally connected at a point 116 to an arm 118 connected to damper D.

In accordance with the foregoing, a complete and essentially trouble-free temperature control system is provided for the control of a solar heat or other installation. By means of the circuitry described, long-term accuracy of operation is assured and component costs are low.

I claim:

1. A multi-channel temperature measurement amplification system comprising:
   first, second, and third multiplexers having a plurality of sequentially operated, coordinately switched, channels, each channel having an input and output, the outputs of said first and second multiplexers being commonly connected together, and the inputs of the channels of said third multiplexer being connected together;
   a reference and common input being connected to one input of a first of said coordinately switched channels of said first and second multiplexers;
   at least one temperature measurement signal means for providing an input to an input of one, other than said first, channel of said first multiplexer;
   amplification means comprising at least one amplifier stage and responsive to the sequential outputs of said channels of said first multiplexer for providing an output to inputs of said channels of said third multiplexer;

at least one reference temperature signal means for providing an input to one, other than said first, channel of said second multiplexer; and signal correction means comprising:
- a differential amplifier having its negative input coupled to the output of said first channel of said third multiplexer, its positive input connected to the output of the channels of said second multiplexer, and its output connected to the input of a stage of amplification of said amplification means, and
- a capacitor being coupled between said first input and output of said differential amplifier, and the polarity of signal coupling of said differential amplifier being such that a negative feedback is effected from the output to input of said amplification means;

whereby at least one temperature measurement signal applied to an input of one of said channels of said first multiplexer is compared with a reference temperature signal, and a significant output is provided from one of the outputs of said third multiplexer when a temperature measurement signal exceeds a signal from said reference temperature signal means appearing in the same channel.

2. An amplification system as set forth in claim 1 including signal delay means for delaying the switching operation of said third multiplexer with respect to the switching operations of said first and second multiplexers, whereby the output of said amplification means is connected before coupling the output of said amplification means through said third multiplexer.

3. An amplification system as set forth in claim 2 wherein said delay is equal to at least approximately 20% of the "on" time of a switched channel of a said multiplexer.

4. An amplification system as set forth in claim 2 wherein each said temperature signal means comprises a pair of differentially connected thermocouples.

5. An amplification system as set forth in claim 4 including:
at least four thermocouples for measuring temperature at discrete locations, two of which thermocouples have like polarity terminals connected to opposite polarity terminals of the other of said two thermocouples to form a common circuit terminal;
three summing junctions, each being connected to a discrete input of a channel of said first multiplexer other than said first channel; and
the other terminal of each thermocouple being coupled through a discrete resistor to at least one of said summing junctions.

6. A multi-channel temperature measurement system comprising:
first, second and third multiplexers having a plurality of sequentially operated, coordinately switched, channels, each channel having an input and output, the output of said first and second multiplexers being connected together, and the inputs of the channels of said third multiplexer being connected together;

a reference input being connected to an input of the first of said coordinately switched channels of said first multiplexers, and said signal means comprising a pair of differentially connected thermocouples, one being positioned in one locale and the other in another locale;

amplification means comprising at least one amplifier stage and responsive to the sequential outputs of said channels of said first multiplexer for providing an output to inputs of said channels of said third multiplexer; and signal correction means comprising:
an amplifier having an input coupled to the output of said first channel of said second multiplexer, and its output being connected to the input of a stage of amplification of said amplification means, and
a capacitor being coupled between the input and output of said last-named amplifier, and the polarity of signal coupling to said last-named amplifier being such that a negative feedback is effected from the output to input of at least one amplifier stage of said amplification means.

* * * * *